(12) United States Patent
Nishiguchi

(10) Patent No.: US 11,153,895 B2
(45) Date of Patent: Oct. 19, 2021

(54) COMMUNICATION DEVICE, COMMUNICATION SYSTEM, AND METHOD OF COMMUNICATION

(71) Applicant: JVC KENWOOD Corporation, Yokohama (JP)

(72) Inventor: Koki Nishiguchi, Yokohama (JP)

(73) Assignee: JVC KENWOOD Corporation, Yokohama (JP)

(*) Notice: Subject to any disclaimer, the term of this patent is extended or adjusted under 35 U.S.C. 154(b) by 243 days.

(21) Appl. No.: 16/268,511

(22) Filed: Feb. 6, 2019

(65) Prior Publication Data
US 2019/0281613 A1 Sep. 12, 2019

(30) Foreign Application Priority Data
Mar. 8, 2018 (JP) .............................. JP2018-041571

(51) Int. Cl.
*H04W 72/12* (2009.01)
(52) U.S. Cl.
CPC .............................. *H04W 72/1263* (2013.01)
(58) Field of Classification Search
None
See application file for complete search history.

(56) References Cited

U.S. PATENT DOCUMENTS 9,338,683 B2 * 5/2016 Fan ..................... H04L 1/0027
9,998,945 B2 * 6/2018 Patil .................. H04W 28/0289
2010/0075592 A1 * 3/2010 Kim .................... H04W 56/001
455/3.01
2011/0130098 A1 * 6/2011 Madan ................. H04W 24/02
455/63.1
2015/0334721 A1 * 11/2015 Kim ..................... H04W 72/02
370/330
2018/0234928 A1 * 8/2018 Yasukawa ............ H04W 92/18
2020/0005644 A1 * 1/2020 Ichimaru ................ B60R 21/00

FOREIGN PATENT DOCUMENTS

JP 08-130774 5/1996
WO 2006/114838 11/2006

* cited by examiner

*Primary Examiner* — Steve R Young
(74) *Attorney, Agent, or Firm* — Amin, Turocy & Watson, LLP

(57) ABSTRACT

There is provided a communication device including a transmission unit that transmits predetermined information to a base station in accordance with a transmission order of its own and a transmission cycle preset in the communication device of its own, a receiving unit that receives, from other communication device, a reception signal and a transmission order preset in the other communication device, and a control unit that extends the transmission cycle of the communication device of its own when the receiving unit receives a specific signal, compares the transmission order of its own with the transmission order of the other communication device to calculate a transmission timing for transmitting the predetermined information to the base station, and controls the transmission unit to transmit the predetermined information to the base station.

4 Claims, 10 Drawing Sheets

COMMUNICATION DEVICE, COMMUNICATION SYSTEM, AND METHOD OF COMMUNICATION

CROSS-REFERENCE TO RELATED APPLICATIONS

This application claims priority from Japanese Application No. 2018-041571, filed on Mar. 8, 2018, the contents of which are incorporated by reference herein in its entirety.

BACKGROUND

1. Technical Field

The present disclosure relates to a communication device, a communication system, and a method of communication.

2. Description of the Related Art

There has been known a technique for collecting information from each communication device by periodically receiving information from a plurality of communication devices.

In JP H8-130774 A, there is disclosed a data transmission system in which a specific transmission timing is calculated for each terminal station on the basis of time information obtained from a global positioning system (GPS) so that transmission timings of terminal stations do not overlap each other.

In a communication system including a plurality of mobile stations and a base station, each mobile station transmits its own location information to the base station in accordance with a preset transmission order and transmission cycle. Here, in a case where an emergency occurs in a specific mobile station among the plurality of mobile stations, the mobile station preferably transmits the location information to the base station in a short transmission cycle to accurately inform the base station of the current location. However, JP H8-130774 A fails to disclose a technique related to mobile stations of, for example, shortening only the transmission cycle after a specific timing such as when the emergency occurs while a transmission timing does not overlap a transmission timing of other mobile stations.

SUMMARY

It is an object of the present disclosure to at least partially solve the problems in the conventional technology. A communication device according to a first embodiment of the present disclosure includes a transmission unit that transmits predetermined information to a base station in accordance with a transmission order of own and a transmission cycle preset in the communication device of own, a receiving unit that receives, from other communication device, a reception signal and a transmission order preset in the other communication device, and a control unit that extends the transmission cycle of the communication device of own when the receiving unit receives a specific signal, compares the transmission order of own with the transmission order of the other communication device to calculate a transmission timing for transmitting the predetermined information to the base station, and controls the transmission unit to transmit the predetermined information to the base station.

A communication system according to a second embodiment of the present disclosure includes a plurality of communication devices, and a base station. Each communication device includes a transmission unit that transmits a transmission signal including predetermined information to a base station in accordance with a preset transmission order and a transmission cycle, a receiving unit that receives, from other communication device, a reception signal and a transmission order preset in the other communication device, and a control unit that changes, when a communication device in a specific state occurs, the transmission cycle of the communication device of own, compares the transmission order of own with a transmission order of other communication device to calculate a transmission timing for transmitting the predetermined information to the base station, and controls the transmission unit to transmit the predetermined information to the base station, and when a first communication device enters a specific state, a control unit of the first communication device controls a transmission unit of the first communication device to transmit predetermined information to the base station in such a manner that a transmission cycle of the communication device of own is shortened and the transmission order is advanced to the first while each control unit of communication devices other than the first communication device extends a transmission cycle of the communication device of own, compares a transmission order of the communication device of own with the transmission order of the first communication device to calculate a transmission timing for transmitting predetermined information to the base station, and controls a transmission unit of the communication device of own to transmit the predetermined information to the base station.

A method of communication according to a third embodiment of the present disclosure includes transmitting a transmission signal including predetermined information to a base station in accordance with a preset transmission order and a transmission cycle, receiving, from other communication device, a reception signal and a transmission order preset in the other communication device, changing, when a communication device in a specific state occurs, a transmission cycle of a communication device of own and calculating a transmission timing for transmitting the predetermined information to the base station by comparing the transmission order of own with a transmission order of other communication device, and transmitting the predetermined information to the base station. The method further includes transmitting, when a first communication device enters a specific state, a specific signal, and transmitting the predetermined information to the base station in such a manner that a transmission cycle of the communication device of own is shortened and the transmission order is advanced to the first, and extending, when the specific signal is received, a transmission cycle of each communication device of own, comparing a transmission order of the communication device of own with the transmission order of the first communication device to calculate a transmission timing for transmitting the predetermined information to the base station, and transmitting the predetermined information to the base station.

The above and other objects, features, advantages and technical and industrial significance of this disclosure will be better understood by reading the following detailed description of presently preferred embodiments of the disclosure, when considered in connection with the accompanying drawings.

DETAILED DESCRIPTION OF THE PREFERRED EMBODIMENTS

Hereinafter, an embodiment of the present disclosure will be described in detail with reference to the accompanying drawings. Note that the same or corresponding parts are denoted by the same reference signs in each drawing, and the descriptions thereof will be omitted as appropriate.

Figure 1:
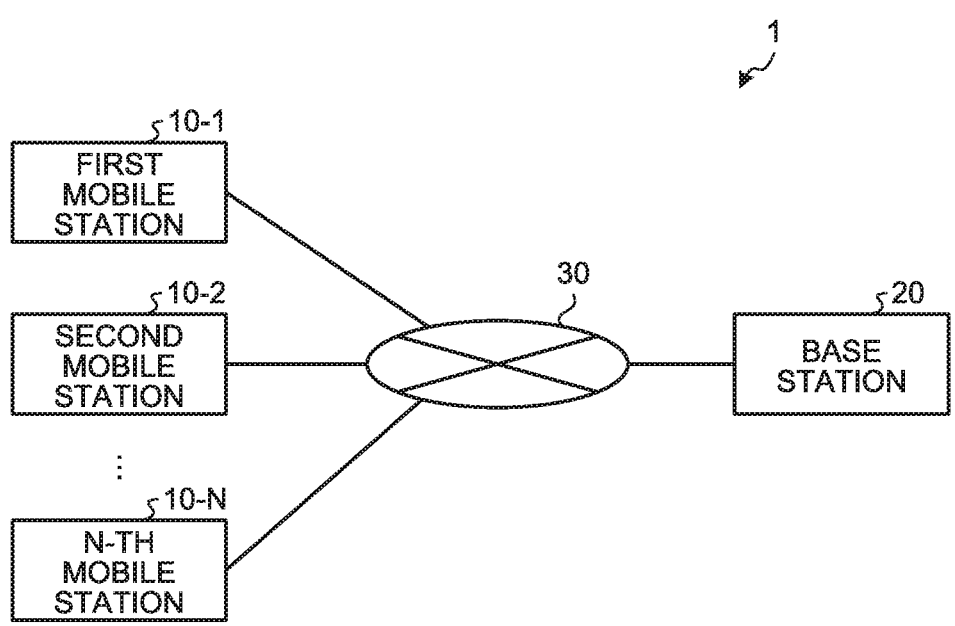
FIG. 1 is a schematic diagram illustrating an exemplary communication system according to an embodiment of the present disclosure.

FIG. 1 is a schematic diagram illustrating an exemplary configuration of a communication system according to the present embodiment.

As illustrated in FIG. 1, a communication system 1 includes a first mobile station 10-1, a second mobile station 10-2, an N-th mobile station 10-N, and a base station 20. In the present embodiment, the first mobile station 10-1 to the N-th mobile station 10-N are, for example, vehicles equipped with a communication device such as a radio. Examples of the vehicle equipped with a radio include a taxi, a patrol car, an ambulance, a fire engine, a garbage truck, a wrecker, a school bus, a security vehicle, and a cash transport vehicle. Further, the first mobile station 10-1 to the N-th mobile station 10-N may be a person carrying a handy type radio (e.g., security guard). The base station 20 is set up in a management center for managing location information of a vehicle, which is equipped with a communication device, such as a taxi, a patrol car, an ambulance, a fire engine, a garbage truck, a wrecker, a school bus, a security vehicle, and a cash transport vehicle.

Each of the first mobile station 10-1 to the N-th mobile station 10-N is connected to the base station 20 via a wireless network 30. The first mobile station 10-1 to the N-th mobile station 10-N transmit their own location information to the base station 20 via the wireless network 30. In each of the first mobile station 10-1 to the N-th mobile station 10-N, order (transmission order), a transmission cycle, and a transmission interval of transmitting its own location information to the base station 20 are set in advance. Specifically, different transmission orders are set for the first mobile station 10-1 to the N-th mobile station 10-N. The same transmission cycle and the transmission interval are set for the first mobile station 10-1 to the N-th mobile station 10-N. Accordingly, each of the first mobile station 10-1 to the N-th mobile station 10-N periodically transmits its own location information to the base station 20 at a timing different from one another so that the timing of transmitting its own location information does not overlap with other mobile stations. In the present embodiment, the number of mobile stations included in the communication system 1 is not limited, which is, for example, several tens to several hundreds.

The transmission cycle indicates an interval between a time at which a certain mobile station transmits its own location information to the base station 20 and the next time at which the certain mobile station transmits its own location information. The transmission interval indicates a time interval between a time at which a mobile station of an N-th transmission order transmits its own location information to the base station 20 and a time at which another mobile station of an (N+1)-th transmission order transmits its own location information to the base station 20.

The base station 20 receives the location information transmitted from each of the first mobile station 10-1 to the N-th mobile station 10-N. The base station 20 can constantly grasp a current location of the first mobile station 10-1 to the N-th mobile station 10-N on the basis of the received location information.

Figure 2:
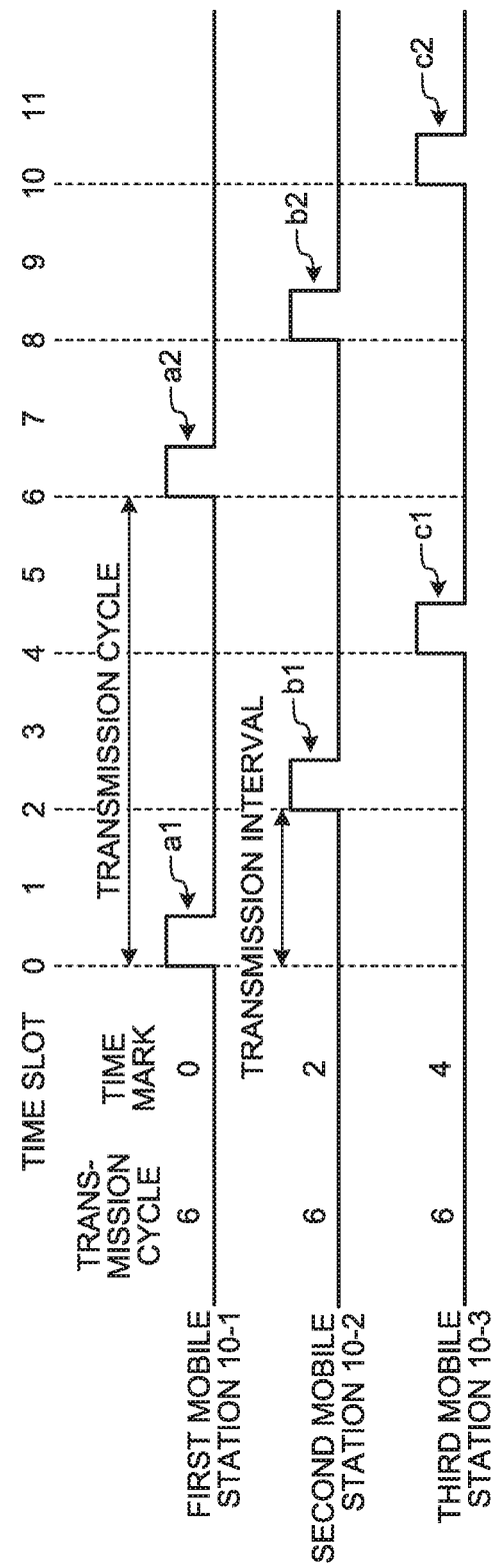
FIG. 2 is a diagram for illustrating exemplary operation of the communication system according to the embodiment of the present disclosure.

FIG. 2 is a diagram for illustrating operation of the communication system according to the embodiment of the present disclosure. A case where the communication system 1 includes the first mobile station 10-1, the second mobile station 10-2, and a third mobile station 10-3 will be described with reference to FIG. 2.

In the communication system 1, the transmission timing at which each mobile station transmits its own location information to the base station 20 is defined by a time mark. The time mark is set for each mobile station, and specifically, it can be obtained by the following formula.

$$\text{Time mark} = (\text{transmission order} - 1) \times \text{transmission interval} \qquad (1)$$

In a case where a plurality of mobile stations transmits its own location information to the base station 20 in the same channel, each mobile station holds a time slot synchronized with all mobile stations, for example, such that the timing of transmitting the location information does not overlap those of the other mobile stations. In this case, each mobile station transmits its own location information to the base station 20 according to its own time slot. The time slot indicates, for example, a value from 0 to 3,599 expressed by the following formula on the basis of a minute value and a second value of the time based on the coordinated universal time (UTC) obtained by each mobile station from a built-in or external GPS receiver.

$$\text{Time slot} = \text{minute} \times 60 + \text{second} \qquad (2)$$

As illustrated in FIG. 2, the transmission cycle of "6" and the transmission interval of "2" are set to each of the first mobile station 10-1, the second mobile station 10-2, and the third mobile station 10-3. In the first mobile station 10-1, the transmission order is set to "1", and the time mark is set to "0". In the second mobile station 10-2, the transmission order is set to "2", and the time mark is set to "2". In the third mobile station 10-3, the transmission order is set to "3", and the time mark is set to "4". In this case, the first mobile station 10-1 transmits, to the base station 20, location information a1 at the time point at which the time slot is "0", and transmits location information a2 at the time point at which the time slot is "6". In this case, the time interval between the transmission time of the location information a1 and the transmission time of the location information a2 is the transmission cycle set in the first mobile station 10-1. The second mobile station 10-2 transmits, to the base station 20, location information b1 at the time point at which the time slot is "2", and transmits location information b2 at the time point at which the time slot is "8". In this case, the time interval between the transmission time of the location information b1 and the transmission time of the location information b2 is the transmission cycle set in the second mobile station 10-2. Further, the time interval between the transmission time of the location information a1 and the transmission time of the location information b1 is the transmission interval set in each mobile station. The third mobile station 10-3 transmits, to the base station 20, location information c1 at the time point at which the time slot is "4", and transmits location information c2 at the time point at which the time slot is "10". In this case, the time interval between the transmission time of the location information c1 and the transmission time of the location information c2 is the transmission cycle set in the third mobile station 10-3. Further, the time interval between the transmission time of the location information b1 and the transmission time of the location information c1 is the transmission interval set in each mobile station. Furthermore, the time interval between the transmission time of the location information c1 and the transmission time of the location information a2 is the transmission interval set in each mobile station. More specifically, each mobile station divides the current time slot by its own transmission cycle, and transmits the location information to the base station 20 when the remainder matches its own time mark.

Figure 3:
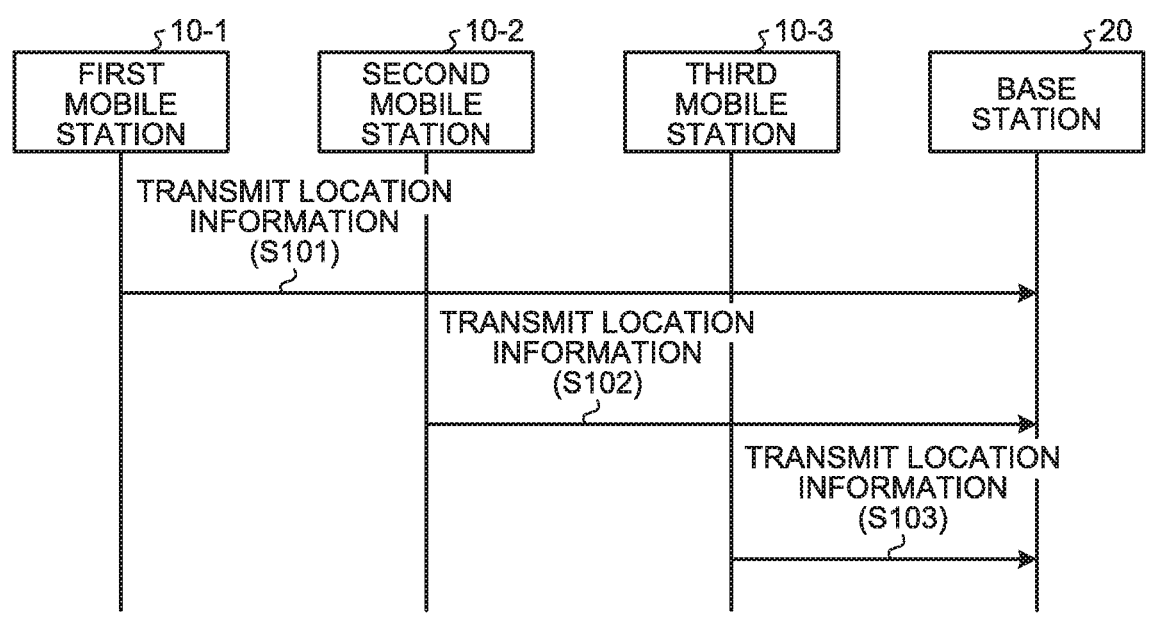
FIG. 3 is a sequence diagram illustrating an exemplary flow of the operation of the communication system in a normal state according to the embodiment of the present disclosure.

A flow of the operation in which the mobile station in a normal state transmits its own location information to the base station will be described with reference to FIG. 3. FIG. 3 is a sequence diagram illustrating an exemplary flow of the operation in which three mobile stations in the normal state transmit location information to the base station in the communication system according to the present embodiment.

As illustrated in FIG. 3, the first mobile station 10-1 transmits its own location information to the base station 20 (step S101). Next, the second mobile station 10-2 transmits its own location information to the base station 20 (step S102). Next, the third mobile station 10-3 transmits its own location information to the base station 20 (step S103). Thereafter, the communication system 1 repeats the processing of step S101 to step S103.

FIG. 1 is referred again. When the first mobile station 10-1 to the N-th mobile station 10-N are switched from the normal state to a specific state, each mobile station transmits a specific signal and its own transmission order to other mobile stations and the base station 20 via the wireless network 30. For example, when the first mobile station 10-1 enters the specific state, the first mobile station 10-1 transmits a specific signal and its own transmission order to the second mobile station 10-2 to the N-th mobile station 10-N and to the base station 20. When the specific state is released, each of the first mobile station 10-1 to the N-th mobile station 10-N transmits a specific release signal to other mobile stations and the base station 20.

The specific state indicates a state in which the location information is preferably transmitted to the base station more preferentially than other mobile stations. For example, the specific state is an emergency state in the case of being assaulted by a robber, medical crisis occurrence, or finding a suspicious vehicle or person in a taxi or the like. The specific signal indicates a signal transmitted to notify other mobile stations and the base station of the specific state when a certain mobile station enters the specific state. For example, the specific signal is an emergency signal to be transmitted in the emergency state.

The first mobile station 10-1 to the N-th mobile station 10-N have similar configurations. Accordingly, operation of the first mobile station 10-1 and the second mobile station 10-2 in the case where the second mobile station 10-2 enters the emergency state to transmit the emergency signal and the first mobile station 10-1 receives the emergency signal will be described. Hereinafter, descriptions will be made with the assumption that the specific state is the emergency state. However, this is an example and does not limit the present disclosure.

When the second mobile station 10-2 enters the emergency state, it transmits its own transmission order and the emergency signal to the first mobile station 10-1 and the base station 20. When the second mobile station 10-2 enters the emergency state, it shortens its own preset transmission cycle. When the second mobile station 10-2 enters the emergency state, it advances its own preset transmission order to the first transmission order. The second mobile station 10-2 transmits its own location information to the base station 20 according to the changed transmission cycle and transmission order. That is, when the second mobile station 10-2 enters the emergency state, it automatically changes the preset transmission cycle and transmission order. Further, when the emergency state is released, the second mobile station 10-2 transmits an emergency release signal to the first mobile station 10-1 and the base station 20. When the emergency state is released, the second mobile station 10-2 resets the changed transmission cycle and transmission order to restore them.

When the emergency signal is received, the first mobile station 10-1 extends a preset transmission cycle (also referred to as first transmission cycle), and changes it to a transmission cycle longer than the first transmission cycle (also referred to as second transmission cycle). The first mobile station 10-1 calculates a transmission timing (time mark) for transmitting the location information to the base station 20 on the basis of a preset transmission order (also referred to as first transmission order) and the transmission order set for the second mobile station 10-2 (also referred to as second transmission order). As will be described in detail later, the first mobile station 10-1 puts off the transmission order by one when the first transmission order is higher than the second transmission order, and does not change the transmission order when the first transmission order is lower than the second transmission order. The first mobile station 10-1 transmits its own location information to the base station 20 according to the second transmission cycle and the calculated transmission timing. That is, upon receiving the emergency signal, the first mobile station 10-1 automatically changes the transmission cycle, the transmission order, and the transmission timing. Upon receiving the emergency release signal, the first mobile station 10-1 resets the changed transmission cycle, transmission order, and transmission timing to restore them.

Figure 4:
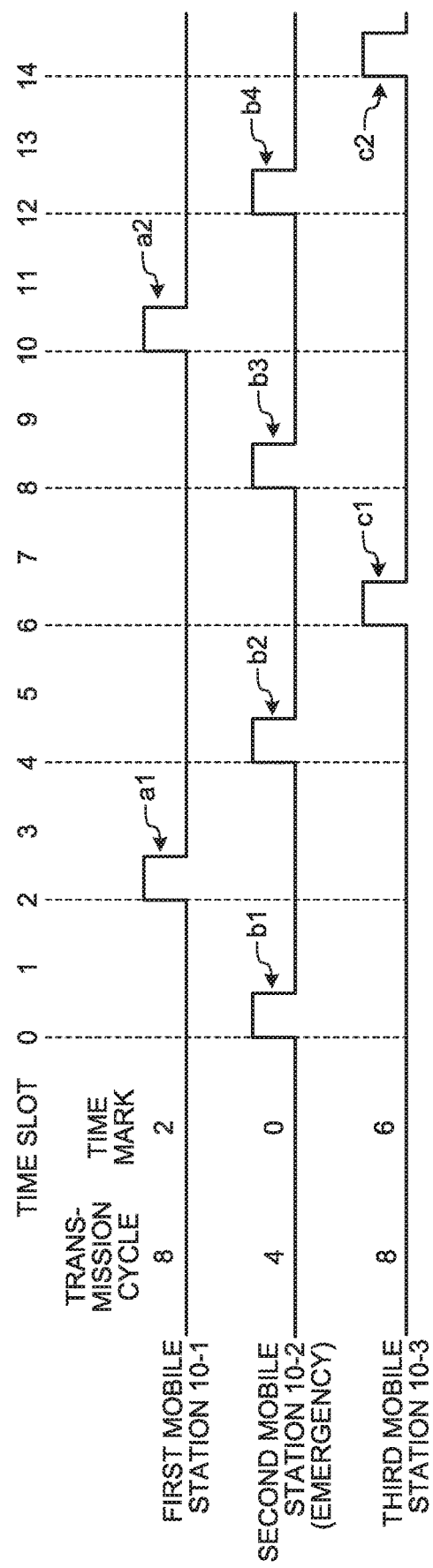
FIG. 4 is a diagram for illustrating exemplary operation of the communication system in an emergency state according to the embodiment of the present disclosure.

The operation of the mobile station in the emergency state will be described with reference to FIG. 4. FIG. 4 is a diagram for illustrating the operation of the communication system in the emergency state according to the embodiment of the present disclosure. FIG. 4 illustrates a case where, in FIG. 2, the second mobile station 10-2 enters the emergency state, and the first mobile station 10-1 and the third mobile station 10-3 transmit the emergency signal.

As illustrated in FIG. 4, the transmission order of the second mobile station 10-2 is advanced to the first, and the transmission cycle is shortened from "6" to "4". In the normal state, the transmission order of the first mobile station 10-1 having the transmission order higher than the second mobile station 10-2 is put off by one from "1" to "2", the time mark is changed from "0" to "2", and the transmission cycle is extended from "6" to "8". In the normal state, although the transmission order of the third mobile station 10-3 having the transmission order lower than the second mobile station 10-2 is not changed, the time mark is changed from "4" to "6", and the transmission cycle is extended from "6" to "8". Note that the transmission interval does not change even when the normal state is changed to the emergency state.

The first mobile station 10-1 transmits the location information of the location information a1 and the location information a2 to the base station 20 while the time slot is "0" to "14". The second mobile station 10-2 transmits the location information of the location information b1, the location information b2, location information b3, and location information b4 to the base station 20 while the time slot is "0" to "14". The third mobile station 10-3 transmits the location information of the location information c1 and the location information c2 to the base station 20 while the time slot is "0" to "14". That is, the second mobile station 10-2 transmits a lot of location information to the base station 20 in a cycle shorter than those of the first mobile station 10-1 and the third mobile station 10-3. Further, since the transmission cycle and the transmission timing of the first mobile station 10-1 and the third mobile station 10-3 are also changed, the timing at which the location information is transmitted do not overlap among the first mobile station 10-1, the second mobile station 10-2, and the third mobile station 10-3. In FIG. 4, transmission of the location information to the base station 20 is repeated in the order of the second mobile station 10-2, the first mobile station 10-1, the second mobile station 10-2, and the third mobile station 10-3. In this case, the mobile station in the emergency state transmits the location information to the base station 20 twice in the period of time between the time at which the mobile station in the normal state transmits the location information to the base station 20 and the time at which it transmits the location information next. The ratio of the number of times the mobile station in the emergency state and the mobile station in the normal state transmit the location information to the base station 20 is an example, and the present disclosure is not limited thereto. For example, the mobile station in the emergency state may transmit the location information to the base station 20 three times or more in the period of time between the time at which the mobile station in the normal state transmits the location information to the base station 20 and the time at which it transmits the location information next. That is, it is only necessary that the transmission cycle of the mobile station in the emergency state is at least shorter than the transmission cycle of the mobile station in the normal state.

Specifically, in the present embodiment, the transmission cycle of the mobile station that has received the emergency signal can be obtained by the following formula, for example.

$$\text{Transmission cycle} = (\text{total number of mobile stations} - 1) \times (\text{transmission interval} \times 2) \quad (3)$$

Here, the total number of mobile stations can be calculated by (transmission cycle in normal state/transmission interval).

In the present embodiment, a process of changing the transmission order of the mobile station that has received the emergency signal differs depending on whether the transmission order in the normal state of the mobile station that has received the emergency signal is higher than the transmission order of the mobile station that has transmitted the emergency signal or lower. In a case where the transmission order in the normal state of the mobile station that has received the emergency signal is lower than the transmission order of the mobile station that has transmitted the emergency signal, the mobile station that has received the emergency signal does not change the transmission order. On the other hand, in a case where the transmission order in the normal state of the mobile station that has received the emergency state is higher than the transmission order of the mobile station that has transmitted the emergency signal, the transmission order of the mobile station that has entered the emergency state is advanced to the first, thereby putting off the transmission order of the mobile station that has received the emergency state by one.

In the present embodiment, the time mark of the mobile station that has received the emergency signal can be obtained by the following formula.

$$\text{Time mark} = (\text{transmission order excluding mobile station in emergency state} - 1) \times (\text{transmission interval} \times 2) + \text{transmission interval} \quad (4)$$

Specifically, a case where the transmission cycle and the time mark are calculated for the first mobile station 10-1 that has received the emergency signal will be described. Since the transmission interval does not change before and after receiving the emergency signal, it is "2" seconds. Since the total number of mobile stations is "3" and the transmission interval is "2" seconds, the transmission cycle is $(3-1) \times (2 \text{ seconds} \times 2) = $ "8" seconds. Since the transmission order excluding the mobile station in the emergency state is "1" and the transmission interval is "2" seconds, the time mark is $(1-1) \times (2 \text{ seconds} \times 2) + 2 \text{ seconds} = 2$ seconds. The formulae (3) and (4) for calculating the transmission cycle and the time mark of the mobile station that has received the emergency signal are examples, which do not limit the present disclosure.

Meanwhile, in the present embodiment, the transmission cycle of the mobile station that has entered the emergency state can be obtained by the following formula, for example.

$$\text{Transmission cycle} = \text{transmission interval} \times 2 \quad (5)$$

In the present embodiment, the transmission order of the mobile station that has entered the emergency state is advanced to the first to be the first place.

In the present embodiment, the time mark of the mobile station that has entered the emergency state can be obtained by the following formula, for example.

$$\text{Time mark} = (\text{transmission order} - 1) \times \text{transmission interval} \quad (6)$$

Specifically, the transmission cycle and the time mark for the second mobile station 10-2 that has entered the emergency state are calculated. Since the transmission interval does not change before and after entering the emergency state, it is "2" seconds. Since the transmission interval is "2" seconds, the transmission cycle is 2 seconds×2=4 seconds. Since the transmission order is "1", the time mark is (1−1)×2 seconds=0. The formulae (5) and (6) for calculating the transmission cycle and the time mark of the mobile station that has entered the emergency state are examples, which do not limit the present disclosure.

Figure 5:
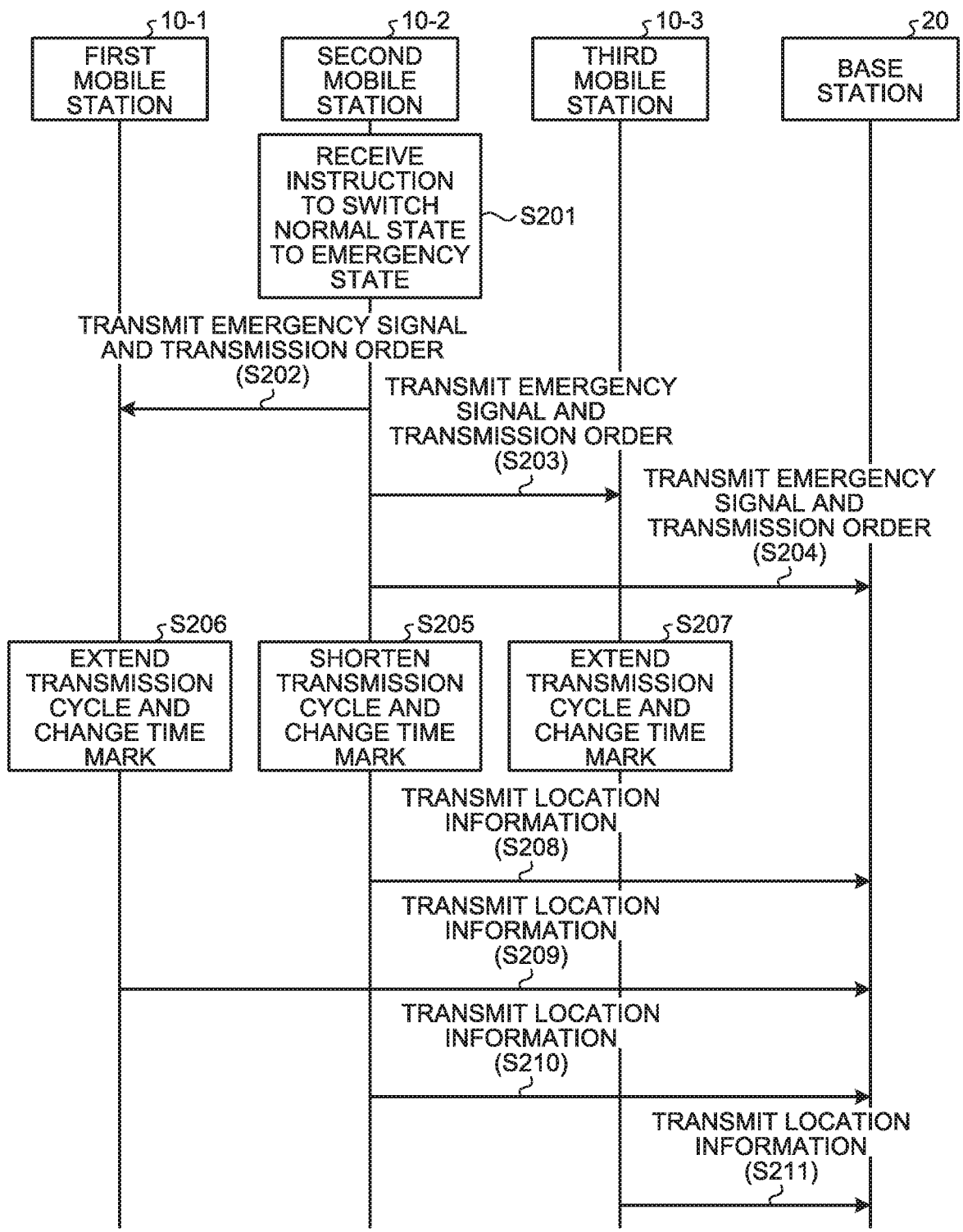
FIG. 5 is a sequence diagram illustrating an exemplary flow of the operation of the communication system in the emergency state according to the embodiment of the present disclosure.

A flow of the operation of the communication system in the case where one mobile station has entered the emergency state will be described with reference to FIG. 5. FIG. 5 is a sequence diagram illustrating an exemplary flow of the operation of the communication system in the case where the second mobile station 10-2 has entered the emergency state in FIG. 3.

As illustrated in FIG. 5, the second mobile station 10-2 receives an instruction from a user to switch from the normal state to the emergency state (step S201). The second mobile station 10-2 transmits the emergency signal and its own transmission order to the first mobile station 10-1 (step S202). The second mobile station 10-2 transmits the emergency signal and its own transmission order to the third mobile station 10-3 (step S203). The second mobile station 10-2 transmits the emergency signal and its own transmission order to the base station 20 (step S204). Note that the operation from step S202 to step S204 may be performed in one step. That is, the second mobile station 10-2 may simultaneously transmit the emergency signal and its own transmission order to the first mobile station 10-1, the third mobile station 10-3, and the base station 20.

The second mobile station 10-2 shortens the transmission cycle, and changes the time mark (step S205). The first mobile station 10-1 extends the transmission cycle, and changes the time mark (step S206). The third mobile station 10-3 extends the transmission cycle, and changes the time mark (step S207).

The second mobile station 10-2 transmits its own location information to the base station 20 (step S208). The first mobile station 10-1 transmits its own location information to the base station 20 (step S209). The second mobile station 10-2 transmits its own location information to the base station 20 (step S210). The third mobile station 10-3 transmits its own location information to the base station 20 (step S211). Thereafter, the communication system 1 repeats the processing of step S208 to step S211.

Figure 6:
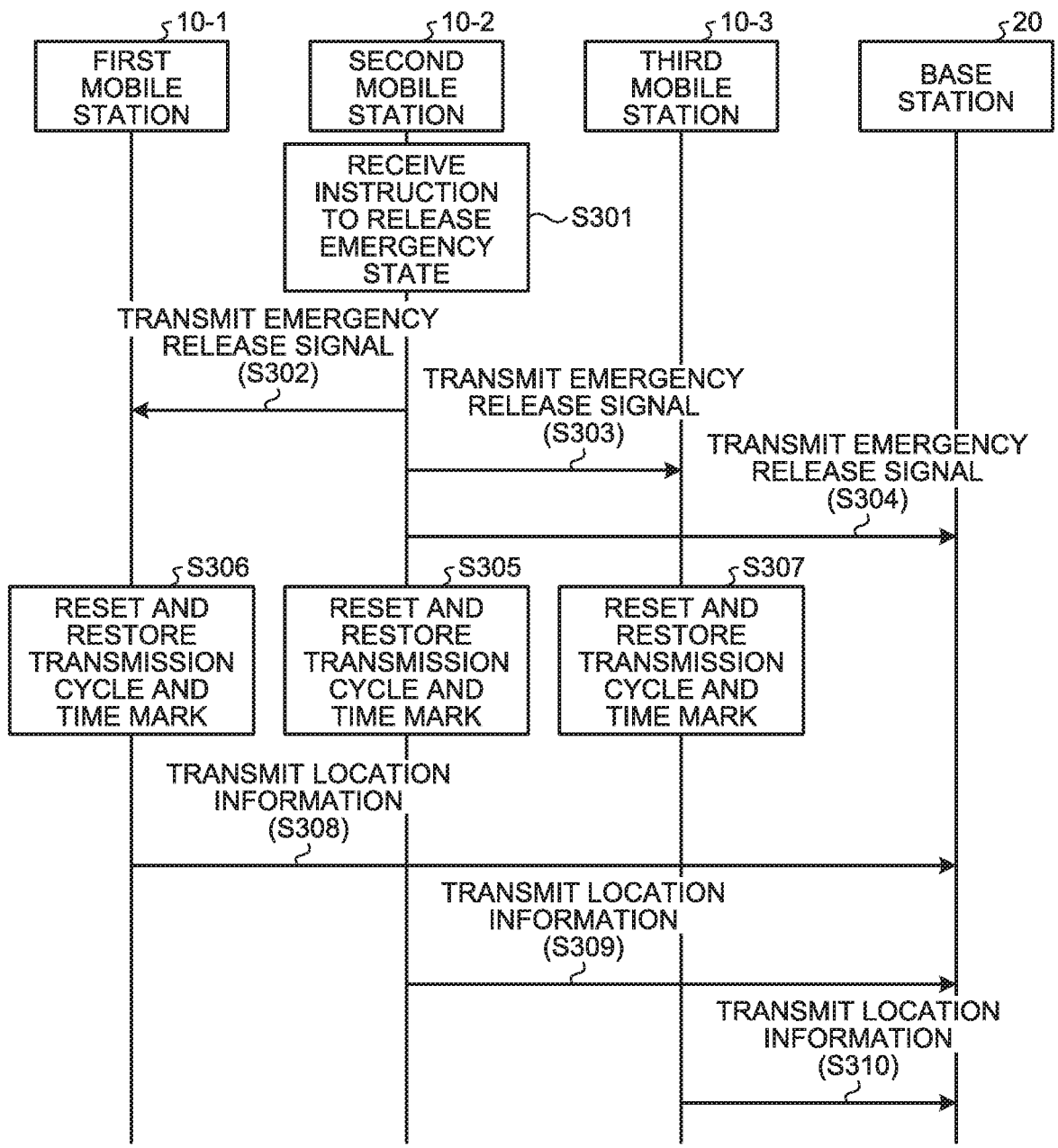
FIG. 6 is a sequence diagram illustrating an exemplary flow of the operation of the communication system according to the embodiment of the present disclosure in a case where the emergency state is released.

A flow of the operation in which the emergency state has been released in the communication system will be described with reference to FIG. 6. FIG. 6 is a sequence diagram illustrating a flow of the operation of the communication system in the case where the emergency state of the second mobile station 10-2 is released in FIG. 5.

As illustrated in FIG. 6, the second mobile station 10-2 receives an instruction from the user to release the emergency state (step S301). The second mobile station 10-2 transmits the emergency release signal to the first mobile station 10-1 (step S302). The second mobile station 10-2 transmits the emergency release signal to the third mobile station 10-3 (step S303). The second mobile station 10-2 transmits the emergency release signal to the base station 20 (step S304). Note that the operation from step S302 to step S304 may be performed in one step. That is, the second mobile station 10-2 may simultaneously transmit the emergency release signal to the first mobile station 10-1, the third mobile station 10-3, and the base station 20.

The second mobile station 10-2 resets the shortened transmission cycle and the changed time mark to restore them (step S305). The first mobile station 10-1 resets the extended transmission cycle and the changed time mark to restore them (step S306). The third mobile station 10-3 resets the extended transmission cycle and the changed time mark to restore them (step S307).

The first mobile station 10-1 transmits its own location information to the base station 20 (step S308). Next, the second mobile station 10-2 transmits its own location information to the base station 20 (step S309). Next, the third mobile station 10-3 transmits its own location information to the base station 20 (step S310). Thereafter, the communication system 1 repeats the processing of step S308 to step S310.

Figure 7:
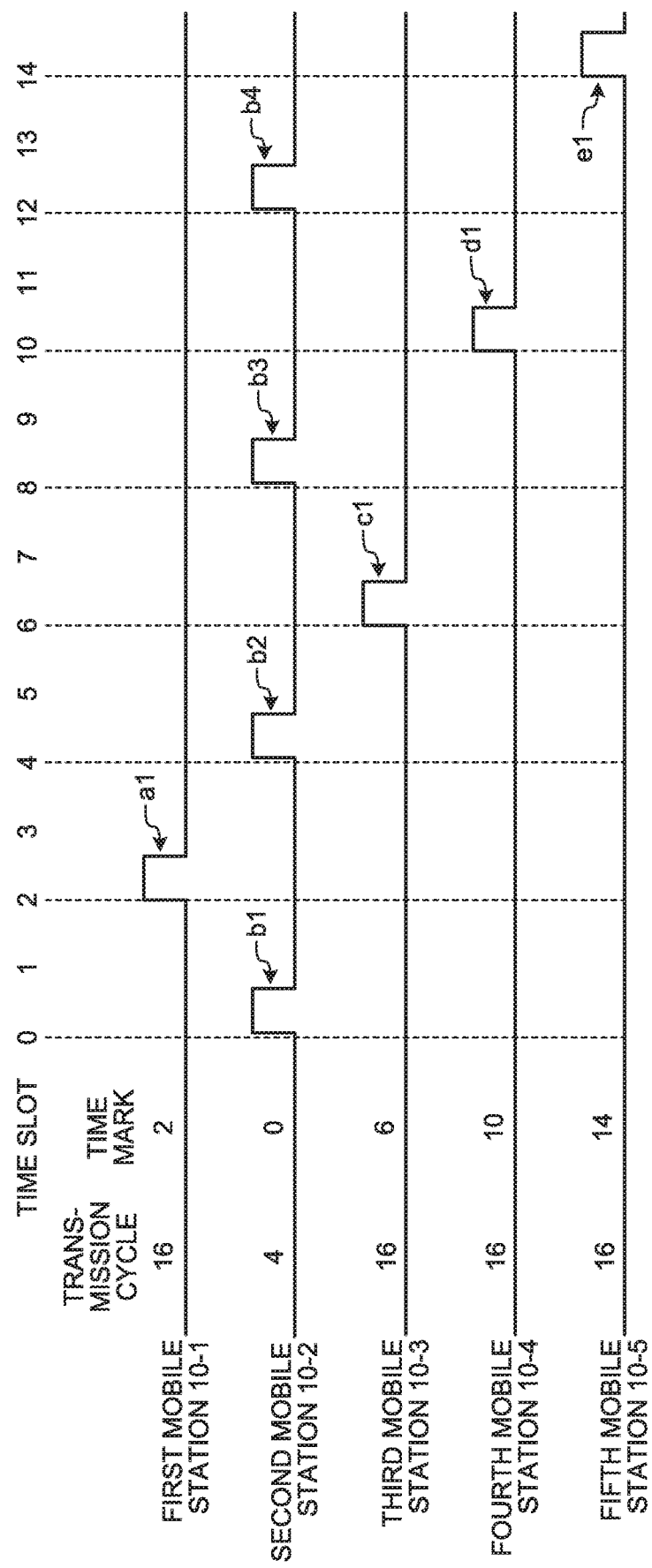
FIG. 7 is a diagram for illustrating exemplary operation of the communication system in the emergency state according to the embodiment of the present disclosure.

In the present embodiment, when the mobile station in the emergency state occurs, the transmission cycle, the time mark, and the like of each mobile station can be calculated by following the formulae (3) to (6) mentioned above regardless of the number of mobile stations. FIG. 7 is a diagram for illustrating the operation of the communication system including five mobile stations in the emergency state. FIG. 7 illustrates a case where the second mobile station 10-2 transmits the emergency signal to the first mobile station 10-1, the third mobile station 10-3, a fourth mobile station 10-4, and a fifth mobile station 10-5.

In the normal state, the first mobile station 10-1 is assumed to have a transmission order of "1" and a time mark of "0". In the normal state, the second mobile station 10-2 is assumed to have a transmission order of "2" and a time mark of "2". In the normal state, the third mobile station 10-3 is assumed to have a transmission order of "3" and a time mark of "4". In the normal state, the fourth mobile station 10-4 is assumed to have a transmission order of "4" and a time mark of "6". In the normal state, the fifth mobile station 10-5 is assumed to have a transmission order of "5" and a time mark of "8".

As illustrated in FIG. 7, when the first mobile station 10-1 receives the emergency signal, the transmission order is set to "1", the transmission cycle is set to "16", and the time mark is set to "2". When the second mobile station 10-2 enters the emergency state, the transmission order is set to "1", the transmission cycle is set to "4", and the time mark is set to "0". When the third mobile station 10-3 receives the emergency signal, the transmission order is set to "2", the transmission cycle is set to "16", and the time mark is set to "6". When the fourth mobile station 10-4 receives the emergency signal, the transmission order is set to "3", the transmission cycle is set to "16", and the time mark is set to "10". When the fifth mobile station 10-5 receives the emergency signal, the transmission order is set to "4", the transmission cycle is set to "16", and the time mark is set to "14". Here, the transmission order of the first mobile station 10-1, the third mobile station 10-3, the fourth mobile station 10-4, and the fifth mobile station 10-5 is the transmission order excluding the mobile station in the emergency state.

The first mobile station 10-1 transmits the location information a1 to the base station 20 while the time slot is "0" to "14". The second mobile station 10-2 transmits four pieces of location information of the location information b1, the location information b2, location information b3, and location information b4 to the base station 20 while the time slot is "0" to "14". The third mobile station 10-3 transmits the location information c1 to the base station 20 while the time slot is "0" to "14". The fourth mobile station 10-4 transmits the location information d1 to the base station 20 while the time slot is "0" to "14". The fifth mobile station 10-5 transmits the location information e1 to the base station 20 while the time slot is "0" to "14". In FIG. 7, transmission of the location information to the base station 20 is repeated in the order of the second mobile station 10-2, the first mobile station 10-1, the second mobile station 10-2, the third mobile station 10-3, the second mobile station 10-2, the fourth mobile station 10-4, the second mobile station 10-2, and the fifth mobile station 10-5. In this case, the mobile station in the emergency state transmits the location information four times while the mobile station in the normal state transmits the location information once.

Figure 8:
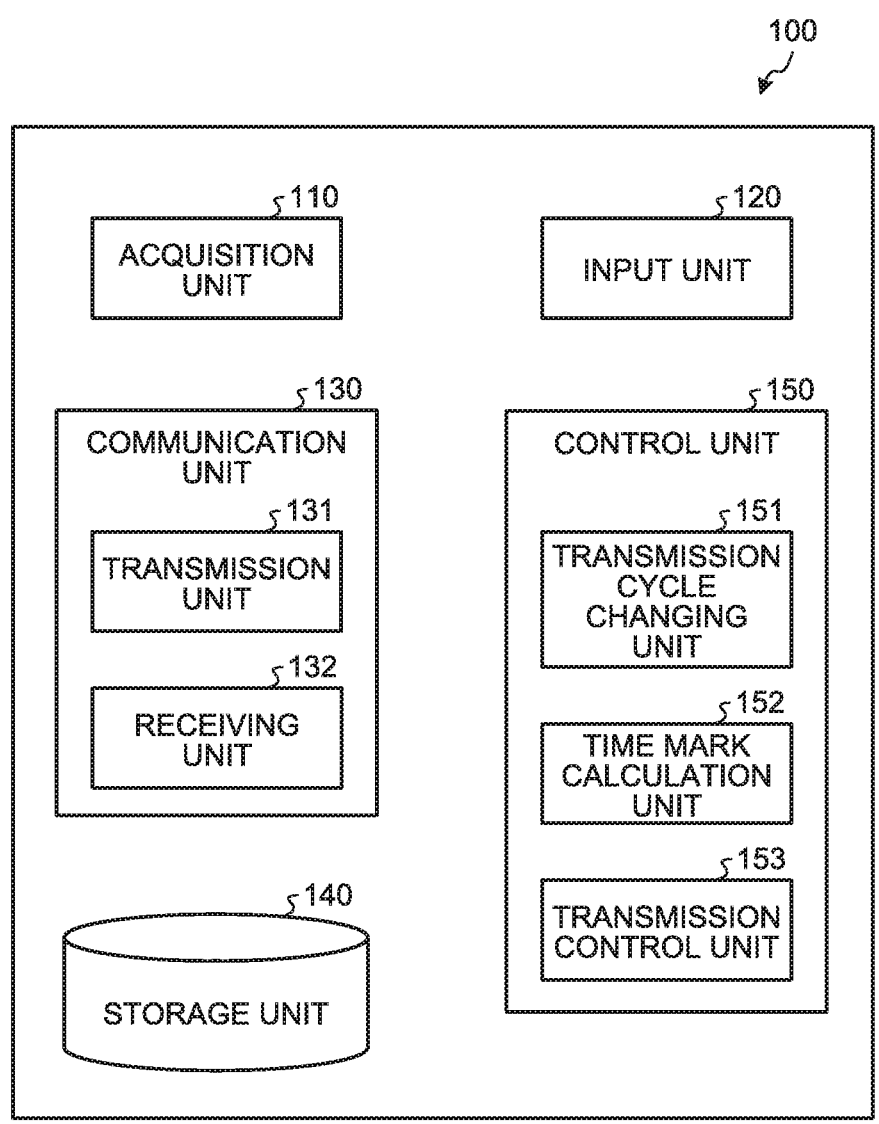
FIG. 8 is a block diagram illustrating an exemplary configuration of a communication device according to the embodiment of the present disclosure.

Next, a configuration of the communication device included in the mobile station according to the present embodiment will be described with reference to FIG. 8. FIG. 8 is a block diagram illustrating an exemplary configuration of the communication device included in each mobile station.

As illustrated in FIG. 8, a communication device 100 includes an acquisition unit 110, an input unit 120, a communication unit 130, a storage unit 140, and a control unit 150. In the present embodiment, the communication device 100 may be an onboard device provided in a vehicle such as a taxi, or may be a mobile terminal carried by the user.

The acquisition unit 110 obtains location information of the communication device 100. A method of obtaining the location information is not particularly limited, and for example, the acquisition unit 110 obtains the location information of the communication device 100 on the basis of a GPS signal received from a GPS satellite. Further, the acquisition unit 110 may obtain the location information of the communication device 100 using other publicly known methods.

The input unit 120 receives an instruction from the user to perform switching from the normal state to the emergency state or to release the emergency state. The input unit 120 is, for example, a button to be pressed by the user. In this case, the user can perform switching from the normal state to the emergency state or release the emergency state by pressing the button. For example, when impact equal to or greater than a predetermined threshold value is applied onto the communication device 100, the input unit 120 may perform switching from the normal state to the emergency state due to the impact. Further, the input unit 120 may perform switching from the normal state to the emergency state when the communication device 100 is not operated for a predetermined period of time.

The communication unit 130 communicates with other communication devices or the base station via a wireless network. The communication unit 130 includes a transmission unit 131 and a receiving unit 132.

The transmission unit 131 transmits its own location information obtained by the acquisition unit 110 to the base station. When the input unit 120 receives an instruction to perform switching from the normal state to the emergency state, the transmission unit 131 transmits its transmission order preset in the communication device 100 and the emergency signal to other communication devices and the base station. When the input unit 120 receives an instruction to release the emergency state, the transmission unit 131 transmits the emergency release signal to other communication devices and the base station.

The receiving unit 132 receives, from other communication device, the transmission order of the other communication device, the emergency signal, the emergency release signal, and the like.

The storage unit 140 stores its own preset transmission order, transmission cycle, transmission interval, time mark, and the like. Further, the storage unit 140 stores a program and the like for the control unit 150 to control each unit of the communication device 100. The storage unit 140 may also be used for temporary storage of data in the communication device 100. The storage unit 140 is, for example, a semiconductor memory element such as a random access memory (RAM), a read-only memory (ROM), and a flash memory, or a storage device such as a hard disk, a solid state derive, and an optical disk. Further, the storage unit 140 may be an external storage device or the like (not illustrated) connected by wired or wireless connection.

The control unit 150 controls each unit included in the communication device 100. Specifically, the control unit 150 loads and executes the program stored in the storage unit 140, thereby controlling each unit included in the communication device 100. When the receiving unit 132 receives the emergency signal, the control unit 150 extends a preset transmission cycle (also referred to as first transmission cycle) stored in the storage unit 140, and changes it to a transmission cycle longer than the first transmission cycle (also referred to as second transmission cycle). The control unit 150 calculates a transmission timing for transmitting the location information obtained by the acquisition unit 110 to the base station on the basis of the preset transmission order of the communication device 100 (also referred to as first transmission order) stored in the storage unit 140 and the transmission order of other communication device that has transmitted the emergency signal (also referred to as second transmission order). The control unit 150 puts off the first transmission order by one when the first transmission order is higher than the second transmission order, and does not change the first transmission order when the first transmission order is lower than the second transmission order. The control unit 150 controls the transmission unit 131 to transmit the location information of the communication device 100 obtained by the acquisition unit 110 to the base station according to the second transmission cycle and the calculated transmission timing. The control unit 150 can be achieved by an electronic circuit or the like including a central processing unit (CPU), for example. The control unit 150 includes a transmission cycle changing unit 151, a time mark calculation unit 152, and a transmission control unit 153.

When the receiving unit 132 receives the emergency signal, the transmission cycle changing unit 151 extends the preset transmission cycle. In this case, the transmission cycle changing unit 151 extends the transmission cycle according to, for example, an expression "(total number of mobile stations−1)×(transmission interval×2)". When the receiving unit 132 receives the emergency release signal, the transmission cycle changing unit 151 resets the extended transmission cycle to restore it.

When the communication device 100 enters the emergency state, the transmission cycle changing unit 151 shortens the preset transmission cycle. In this case, the transmission cycle changing unit 151 shortens the transmission cycle according to, for example, an expression "transmission interval×2". When the emergency state of the communication device 100 is released, the transmission cycle changing unit 151 resets the shortened transmission cycle to restore it.

When the receiving unit 132 receives the emergency signal or the communication device 100 enters the emergency state, the time mark calculation unit 152 calculates a new time mark different from the preset time mark stored in the storage unit 140.

When the receiving unit 132 receives the emergency signal, the time mark calculation unit 152 calculates the time mark according to an expression "(transmission order excluding mobile station in emergency state−1)×(transmission interval×2)+transmission interval". When the communication device 100 enters the emergency state, the time mark calculation unit 152 calculates the time mark according to an expression "(transmission order−1)×transmission interval".

The transmission control unit 153 controls the transmission unit 131 to transmit the location information of the communication device 100 to the base station. When the communication device 100 enters the emergency state, the transmission control unit 153 controls the transmission unit 131 such that the transmission order of the communication device 100 and the emergency signal are transmitted to other communication devices and the base station. When the communication device 100 enters the emergency state, the transmission control unit 153 controls the transmission unit 131 such that the location information of the communication device 100 is transmitted to the base station in accordance with the transmission cycle changed by the transmission cycle changing unit 151 and the time mark calculated by the time mark calculation unit 152. When the emergency state of the communication device 100 is released, the transmission control unit 153 controls the transmission unit 131 such that the emergency release signal is transmitted to other communication devices and the base station.

Figure 9:
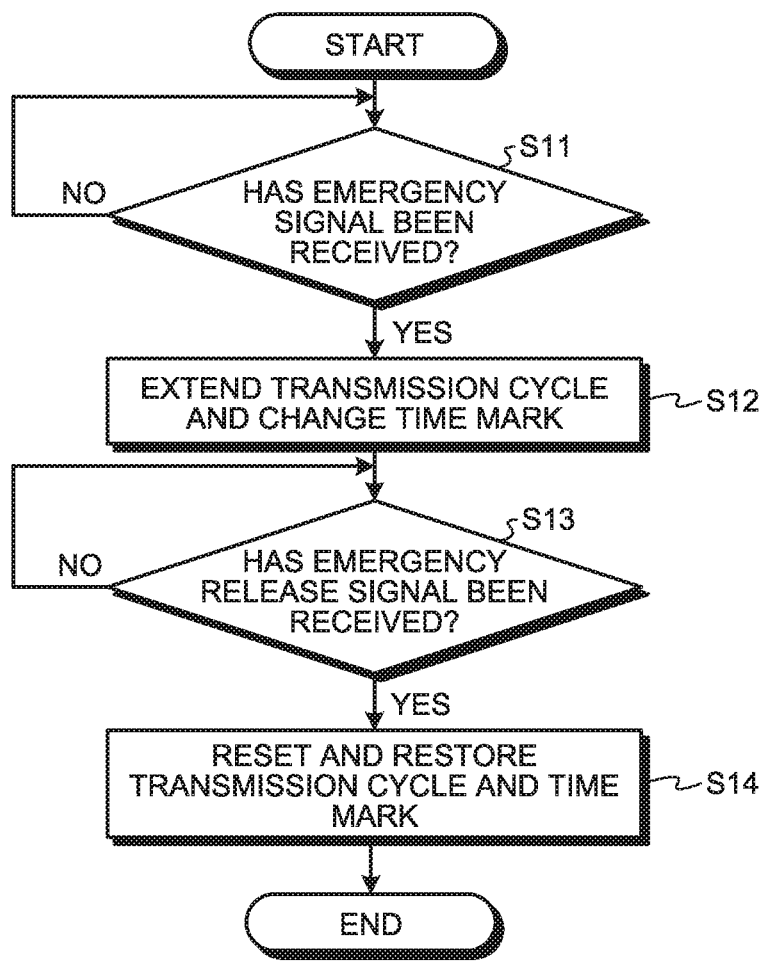
FIG. 9 is a flowchart illustrating an exemplary flow of operation of the communication device according to the embodiment of the present disclosure in a case where an emergency signal is received.

Next, an operational flow of the control unit 150 of the communication device 100 will be described with reference to FIG. 9. FIG. 9 is a flowchart illustrating an exemplary flow of the operation of the control unit 150 from when the communication device 100 receives the emergency signal from other communication device until when it receives the emergency release signal.

When the receiving unit 132 does not receive the emergency signal ("No" in step S11), the control unit 150 repeats the operation in step S11. When the receiving unit 132 receives the emergency signal ("Yes" in step S11), the control unit 150 proceeds to step S12.

The control unit 150 extends the transmission cycle, and changes the time mark (step S12). Then, the control unit 150 proceeds to step S13.

When the receiving unit 132 does not receive the emergency release signal ("No" in step S13), the control unit 150 repeats the operation in step S13. When the receiving unit 132 receives the emergency release signal ("Yes" in step S13), the control unit 150 proceeds to step S14.

The control unit 150 resets the extended transmission cycle and the changed time mark to restore them (step S14). Then, the control unit 150 terminates the operation.

Figure 10:
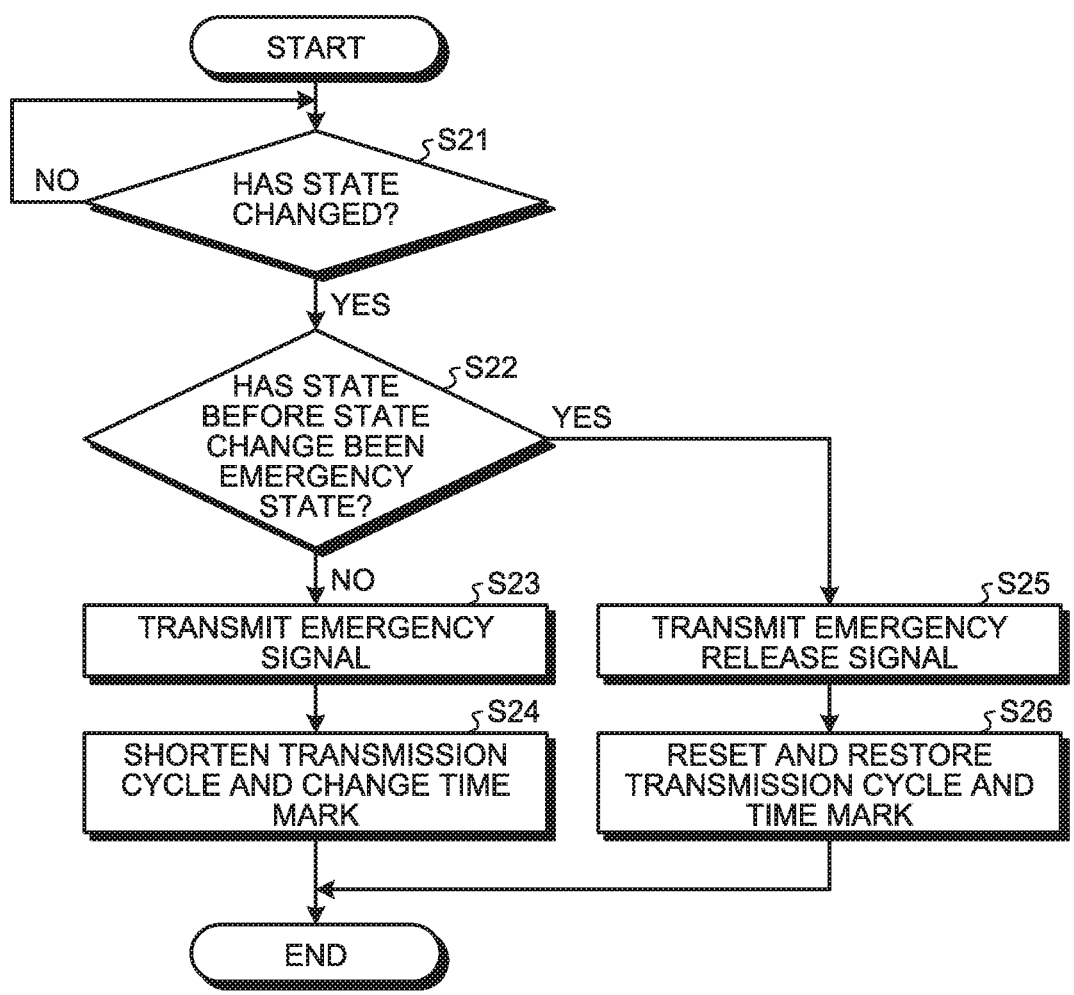
FIG. 10 is a flowchart illustrating an exemplary flow of the operation of the communication device according to the embodiment of the present disclosure in a case where the emergency signal is transmitted.

Next, a flow of the operation of the communication device 100 will be described with reference to FIG. 10. FIG. 10 is a flowchart illustrating a flow of the operation of the control unit 150 in a case where the communication device 100 changes from the normal state to the emergency state or from the emergency state to the normal state.

When the state of the communication device 100 does not change ("No" in step S21), the control unit 150 repeats the processing in step S21. When the state of the communication device 100 has changed ("Yes" in step S21), the control unit 150 proceeds to step S22.

When the state of the communication device 100 before the state has changed is not the emergency state ("No" in step S22), the control unit 150 proceeds to step S23.

The control unit 150 transmits the transmission order of the communication device 100 and the emergency signal to other communication devices (step S23). Then, the control unit 150 proceeds to step S24.

The control unit 150 shortens the transmission cycle of the communication device 100, and calculates a new time mark (step S24). Then, the control unit 150 terminates the operation.

Meanwhile, in step S22, when the state of the communication device 100 before the state has changed is the emergency state ("Yes" in step S22), the control unit 150 proceeds to step S25.

The control unit 150 controls the transmission unit 131 to transmit the emergency release signal to other communication devices (step S25). Then, the control unit 150 proceeds to step S26.

The control unit 150 resets the shortened transmission cycle and the changed time mark to restore them (step S26). Then, the control unit 150 terminates the operation.

As described above, in the present embodiment, each mobile station stores formulae for calculating the transmission cycle and the time mark in advance. Therefore, each mobile station can autonomously change the transmission order, the transmission cycle, and the time mark when it enters a specific state or receives a specific signal. As a result, according to the present embodiment, it becomes possible to set the timing at which the location information is transmitted not to overlap each other between mobile stations regardless of the control of the base station.

Further, in the present embodiment, the mobile station in the specific state can transmit the location information to the base station in a short cycle. Accordingly, the base station can more accurately grasp the current location of the mobile station in the specific state. Furthermore, in the present embodiment, although the cycle becomes long, other mobile stations that have received the specific signal can continuously transmit the location information to the base station. Accordingly, the base station can continuously grasp the current location of the other mobile stations.

Although the case where, among a plurality of mobile stations, only one mobile station enters the emergency state has been described in the present embodiment, this is an example, and the present disclosure is not limited thereto. According to the present embodiment, even in a case where two or more mobile stations enter the emergency state at the same time, the transmission cycle and the time mark of each mobile station can be calculated on the basis of the preset transmission order and transmission cycle. In such a case, for example, the transmission order within the mobile stations in the emergency state may be calculated, and the transmission order, the transmission cycle, and the time mark of each mobile station may be calculated such that all the mobile stations in the emergency state transmit the location information and then mobile stations in the normal state transmit the location information.

According to the present disclosure, it is possible to shorten a transmission cycle and to prevent a transmission timing from overlapping with that of other communication device when it is in a specific state.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A communication device, comprising:
   a transmission unit that transmits predetermined information to a base station in accordance with a preset transmission order and a preset transmission cycle, and that transmits the transmission order and a specific signal to other communication device when the communication device is in a specific state;
a receiving unit that receives, from the other communication device a preset transmission order and a specific signal of the other communication device; and
a control unit that changes the transmission order and the transmission cycle and controls the transmission unit to transmit the predetermined information to the base station when the receiving unit receives the specific signal from the other communication device, wherein
when the communication device is in the specific state, the control unit shortens the transmission cycle and calculates a transmission timing of the predetermined information by advancing the transmission order to a first, and controls the transmission unit to transmit the predetermined information to the base station, and
when the receiving unit receives the specific signal from the other communication device, the control unit extends the transmission cycle and calculates a transmission timing of the predetermined information by comparing the transmission order with the received transmission order of the other communication device and changing the transmission order, and controls the transmission unit to transmit the predetermined information to the base station.

2. The communication device according to claim 1, wherein the control unit puts off the transmission order when the transmission order is higher than the received transmission order of the other communication device, and does not change the transmission order when the transmission order is lower than the received transmission order of the other communication device.

3. A communication system, comprising:
a plurality of communication devices; and
a base station, wherein
each communication device includes:
a transmission unit that transmits a transmission signal including predetermined information to a base station in accordance with a preset transmission order and a preset transmission cycle, and that transmits the transmission order and a specific signal to other communication device when the communication device is in a specific state;
a receiving unit that receives, from the other communication device, a preset transmission order and a specific signal of in the other communication device; and
a control unit that changes the transmission order and the transmission cycle and controls the transmission unit to transmit the predetermined information to the base station, when the communication device in the specific state or the receiving unit receives the specific signal from the other communication device,
wherein
when the communication device is in the specific state, the control unit shortens the transmission cycle and calculates a transmission timing of the predetermined information by advancing the transmission order to a first, and controls the transmission unit to transmit the predetermined information to the base station, and
when the receiving unit receives the specific signal from the other communication device, the control unit extends the transmission cycle and calculates a transmission timing of the predetermined information by comparing the transmission order with the received transmission order of the other communication device and changing the transmission order, and controls the transmission unit to transmit the predetermined information to the base station.

4. A method of communication, comprising:
transmitting a transmission signal including predetermined information to a base station in accordance with a preset transmission order and a preset transmission cycle, and that transmits the transmission order and a specific signal to other communication device when a communication device is in a specific state;
receiving, from the other communication device, a preset transmission order and a specific signal of the other communication device; and
changing the transmission order and the transmission cycle and calculating a transmission timing of the predetermined information to the base station, when the communication device is in the specific state or the specific signal is received from the other communication device,
wherein
the method further includes:
when the communication device is in the specific state, shortening the transmission cycle and calculating a transmission timing of the predetermined information by advancing the transmission order to a first, and transmitting the predetermined information to the base station; and
when the specific signal is received from the other communication device, extending the transmission cycle and calculating a transmission timing of the predetermined information by comparing the transmission order with the received transmission order of the other communication device, and transmitting the predetermined information to the base station.

* * * * *